Sept. 22, 1953            S. LISTON            2,652,791
MOLDING, BAKING, DEPANNING, AND
DELIVERING MEANS FOR LOAVES
Filed May 7, 1951

Inventor:
SOL LISTON

Patented Sept. 22, 1953

2,652,791

UNITED STATES PATENT OFFICE 2,652,791

MOLDING, BAKING, DEPANNING, AND DELIVERING MEANS FOR LOAVES

Sol Liston, St. Kilda, Melbourne, Victoria, Australia

Application May 7, 1951, Serial No. 224,879
In Australia March 15, 1951

5 Claims. (Cl. 107—57)

My invention relates to improvements in baking, de-panning and delivering means for loaves of bread, block cakes, rolls and the like, which hereinafter are referred to as "loaves"; and the objects of my improvements are, first, to provide automatic means for removing the baked loaves from the pans and, second, to enable the dough loaves to be baked, de-panned and delivered automatically to a receiving position. I attain these objects by mechanism illustrated in the accompanying drawing, in which—

A conveyor 1 is carried by rotatable sprocket wheels 2, one or both of which may be driven by any suitable form of driving mechanism (not shown). Pans 3 are attached to the endless conveyor so that they are carried thereby through an oven (shown in broken lines in Fig. 1) after having passed all stages in the making of loaves and are returned, while suspended from the conveyor in inverted position, to the front of the oven where they pass again into an upright position for re-charging.

Figure 1:
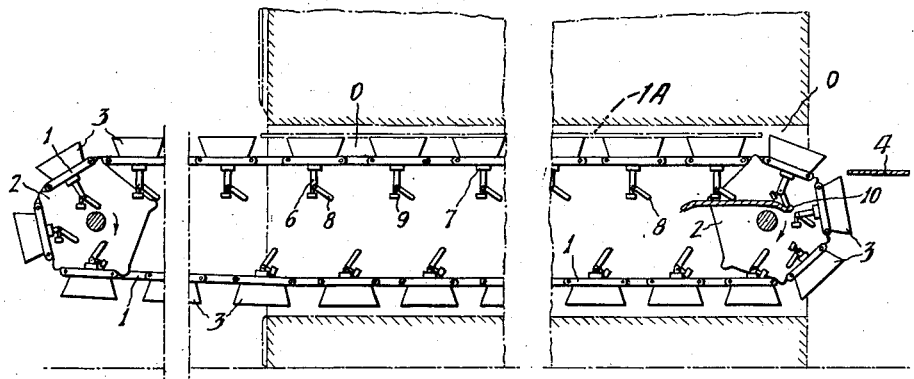
Figure 1 is a side elevation of the mechanism in which means is provided to raise the bottoms of the pans at an appropriate point in the movement of an endless conveyor, to loosen the loaves in the pans.

This invention may be applied to ovens already fitted with conveyors for the automatic baking of loaves, or ovens of any type not so fitted may be converted into automatic ovens by cutting away portion of the face of the oven and fitting conveyors suitably into the oven. If there is not sufficient room at the back of the oven for discharging the baked loaves on to another conveyor, the driving mechanism of the conveyor may be made reversible so that the pans can be both loaded and discharged at the front of the oven. When the conveyor discharges at the rear of the oven it will normally do so on to a cross conveyor which carries the loaves automatically to a suitable delivery point. The cross conveyor is indicated diagrammatically at 4. Any suitable means (not shown) may be provided for closing the pans if it is desired to bake the loaves in closed pans; for example, the pans during the baking may pass along beneath a fixed cover plate 1A as indicated in Figure 1. The plate 1A, of course, could be made up of several separate portions.

Figure 2:
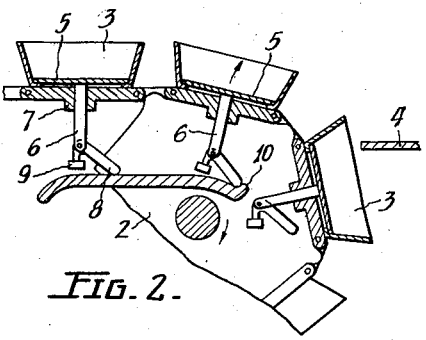
Figure 2 is an enlarged detailed view of portion of Figure 1.
Figure 3:
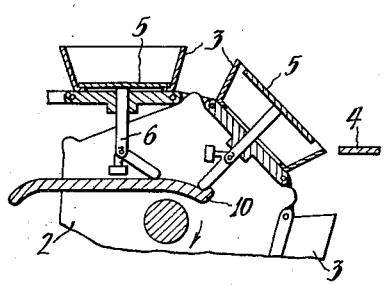
Figure 3 is a view similar to Figure 2 but with the loose bottom of one of the pans raised.

In the constructions shown in Figures 1-3 the pans are suitably spaced and each pan is provided with a loose or separate bottom 5 and means is provided to raise this bottom (and thus the loaf) automatically at a point in the travel of the conveyor represented by the right hand portion of Figure 1, where the loaves have been baked to the required degree. To prevent or to minimise the adherence of the loaves to the pans, normally the pans will be greased or the loaves will be encased in a carton or wrapping, or other treatment will be provided to prevent the dough from being baked on to the pan into a state of firm adherence. After raising the loose bottoms, the loaves are tipped automatically out of the pans on to the cross conveyor 4. Clips or other means (not shown) are provided to connect the pans to the conveyor so that they will be suspended from the conveyor in inverted position during travel along the lower run of the conveyor and so that they will not otherwise be displaced relative to the conveyor—as, for example, when the bottoms of the pans are being raised as above-mentioned. The term "pan" is used herein to include any suitable form of mould, made from metal and/or solid plastic, laminated metal compounds, or alloys.

In Figures 1-3 means for raising the loose bottoms 5 is shown. Each loose bottom is carried by a plunger 6 which is slidable in a slideway passing through a boss 7 on the conveyor and is provided with a lifter arm 8 which is pivoted to the lower end of the plunger and which is provided with a counter-weight 9 disposed at an angle relative to the arm 8. This counterweight causes the lifter arm to extend forwardly at an angle relative to the plunger 6 when the pan in question is travelling along the upper portion of its path. A trip member 10 is provided near the end of said upper portion of the path and, when the end of the lifter arm 8 engages the trip member, the lift arm 8 is straightened relative to the plunger and the plunger 6 is raised (as in Fig. 3) and thus lifts the loose bottom and loosens the loaf from the pan so that, either then or at a slightly later stage in the travel of the conveyor, as the pan in question travels around the sprocket, the loaf is discharged on to the cross conveyor 4. The conveyor 1 passes on with the emptied pans and after the latter have been charged again with a batch of dough loaves, returns the pans to the oven. When the pans again reach the upper portion of their path the loose bottoms and plungers gravitationally fall back into position so that the next batch of dough loaves can then be placed in the pans by any means. The left hand portion of the conveyor 1 in Figure 1 extends from the dough-feeding position through the final proof room and then into the oven. The invention is thus adapted for use in a continuous closed circuit of making, proving, baking, and delivering.

In Figs. 1-3, limit stops (not shown) may be provided on the plungers 6 or the upper ends of the lifter arms 8 may so function to prevent the loose bottoms 5 from falling out of the pans when the latter are inverted.

Normally, the loose bottom will be the only bottom provided in the pan and will rest on flanges 13 but, if desired, the loose bottom may be positioned above a fixed bottom (not shown); in that case the plungers would pass through apertures in the fixed bottoms.

It is of course not essential that the delivery of the loaves should be on to a cross conveyor as in some cases where suitable space is available the main conveyor, or a conveyor receiving the loaves from the pans of the main conveyor, could be arranged to pass out through the back of the oven in any desired direction.

I claim:

1. In apparatus for baking, de-panning and delivering loaves; the combination of an endless conveyor travelling along substantially horizontal upper and lower runs, pans attached to said conveyor for movement with the latter, a loose bottom in each of said pans, a plunger attached to each loose bottom, a lifter arm pivotally connected to each plunger, means operative to hold said lifter arm in a position inclined in the direction of the conveyor movement relative to said plunger during movement of the related pan along said upper run of the conveyor, and tripping means located adjacent the terminal portion of said upper run of said conveyor and operative to engage each lifter arm during travel of the related pan over said terminal portion of the upper run and to straighten said engaged lifter arm relative to the respective plunger for raising the loose bottom attached to the latter.

2. In apparatus for baking, de-panning and delivering loaves; the combination according to claim 1, wherein said means operative to hold each lifter arm in inclined position includes a counter-weight secured to the lifter arm and angularly displaced relative to the latter.

3. In apparatus for baking, de-panning and delivering loaves; the combination according to claim 1 further comprising a fixed cover plate disposed adjacent said upper run of the conveyor and operative to overlie and cover said pans as the latter move along a portion of said upper run and the contents of the pans are baked.

4. In apparatus for baking, de-panning and delivering baked loaves; the combination of a continuous conveyor travelling along elongated and spaced apart, horizontal upper and lower runs, pans attached to said conveyor for movement with the latter in upright positions along said upper run and in inverted positions along said lower run, a loose bottom in each of said pans being gravitationally maintained at the bottom of the related pan during a substantial part of the travel of the latter along said upper run, a plunger attached to each loose bottom and extending normal to the path of travel of the related pan, a lifter arm pivotally connected to each plunger, means yieldably holding said lifter arm in a position inclined in the direction of the conveyor movement relative to said plunger during movement of the related pan along said upper run, and a tripping member disposed adjacent the terminal end of said upper run and operative to engage each successive lifter arm during travel of the related pan over said terminal portion and to straighten the engaged lifter arm relative to the respective plunger for raising the loose bottom attached to the latter relative to the related pan.

5. In apparatus for baking, de-panning and delivering baked loaves; the combination according to claim 4, wherein said tripping member includes a track section adapted to underlie the free end of each lifter arm as the related pan travels along said terminal portion, and a blocking element at the end of said track section to arrest further movement of said end of the lifter arm so that continued movement of the related pan and plunger causes the lifter arm to swing relative to the latter.

SOL LISTON.

References Cited in the file of this patent

UNITED STATES PATENTS

| Number | Name | Date |
|---|---|---|
| 1,345,079 | Fisch | June 29, 1920 |
| 1,429,093 | Paranteau | Sept. 12, 1922 |
| 1,434,035 | Ballard | Oct. 31, 1922 |